United States Patent Office 3,441,824
Patented Apr. 29, 1969

3,441,824
EMBOSSING MACHINE
Walter E. Rudisch, East Amherst, N.Y., and Frank D. Gross, Freedom, Pa., assignors to The Pannier Corporation, Pittsburgh, Pa., a corporation of Pennsylvania
Original application Aug. 13, 1964, Ser. No. 389,364, now Patent No. 3,282,389, dated Nov. 1, 1966. Divided and this application Mar. 23, 1966, Ser. No. 536,890
Int. Cl. H02p 1/22, 3/20
U.S. Cl. 318—265
19 Claims

ABSTRACT OF THE DISCLOSURE

A motor driven insulating member having mounted in alignment thereon a logic circuit contact and a function circuit contact to engage with a mounted aligned series of stationary brushes each of which when individually energized initiates a specific logic circuit that may include the logic circuit contact to determine and induce the shortest direction of movement of the motor driven insulating member to end the logic movement and to engage the energized brush with the function circuit contact to initiate and complete the function then clear these selective circuits for the next consecutive energized brush to continue and complete integrated functions. This novel insulated member has only one logic circuit contact in spaced alignment with a small function circuit contact for engagement by an energized selected brush. Or this novel insulated member has two aligned logic circuit contacts in spaced alignment with a small function circuit contact therebetween. These novel insulated members being either a circular disc with a rotary motor drive, or a flat insulated strip having two logic circuits in alignment with a small function contact and a motor drive to move the strip in opposite directions and a relay circuit means to determine the direction of movement of the strip relative to the logic circuit contact and a selected energized brush in a series to complete the logic movement and thereafter engage the energized brush with the function circuit contact to initiate and complete a function and then clear the circuits for energization of the next selected circuit brush to complete its function.

This invention relates generally to selection circuits and more specifically to a logic circuit for determining the direction of rotation of a member which when selecting a circuit discriminates the shortest rotary distance to a predetermined rotary position of the member for performing a function which may be one completing an information circuit or merely selecting an integer.

This application is a division of copending application Ser. No. 389,364, filed Aug. 13, 1964, for Rotary Imprinting Machine Moving Selected Character to Imprinting, which issued Nov. 1, 1966, as United States Patent 3,282,389.

Circuits of this character may be employed in many arts such as imprinting machines and embossing machines and punching machines where the letters, figures or other indicia is on the rotary member, or in a selective relay circuit such as an intermediate step in many different electronic selecting integer circuits or on a memory drum.

Circuits of this character may be mounted on a rotary disc in the form of circular voltage divider circuits the ends of which are connected to collector rings and wherein the intermediate voltage represents the reference point and is connected to a collector ring. The greater or lesser voltage selects the direction of rotation through a stationary brush for each position to be selected. This type of selection rotation must carry the divider resistance circuit on the disc which is a costly circuit initially and expensive in upkeep.

Another logic circuit of this character is obtained through the use of two semicircular or arcuate contacts or strips and an operating contact therebetween, all of the same radius, mounted on a rotary disc and each connected to a separate annular collector ring. The semicircular and operating contacts and their collector ring are engaged by stationary brushes, one for each position to be selected, and the position of the next selected digit through its respective energized stationary brush engages the proper semicircular contact to determine the direction of rotation, and upon rotating, the logic disc moves the operating contact into engagement with the selected energized stationary brush.

One of the objects of the present invention further reduces the structure and circuit by eliminating one of the half or semicircular contact rings on the logic disc.

Another object provides the use of an additional contact for an operating circuit in the same circular radius as the directive semicircular contact segment, and which is representative of an additional function than selection. In the instance of a circuit monitor or an imprinting machine this additional function may be a stop such as applying a brake to arrest the rotation of the rotary disc carrying the directive circuit. Although this may be employed to stop and physically imprint a number, in machines employed to select a circuit from a memory drum in completing a circuit it may be that the mere completion of a progressive circuit is all that is necessary and a stop or brake is not necessary. The next consecutive indication or pulse is determined by rotary selection that may be immediately initiated at the engagement of the energized brush at the operating contact so that the disc or drum may continue in the same direction or be reversed by the next energized brush for the next digit or signal. In some instances a brake may be employed in other instances the disc may be reversed without applying a brake or even having one. The equipment immediately reverses to complete the function of the next pulse.

Another object is the provision of a rotation direction logic circuit that employs a rotary member with a semicircular collector strip to operate in combination with a circular series of stationary brushes each representing two independent functions, one a circuit that determines the direction of rotation depending upon the relative position of a member and whether the selected circuit through the energized brush engaged or did not engage the semicircular collector strip. If the selected brush did not engage the semicircular collector strip during the selection period the circuit would energize to drive the disc in one direction of rotation. If the selected energized brush did engage the semicircular collector strip during the selection period the circuit closed would energize a relay to complete the circuit and drive the member in the opposite direction of rotation. Since the semicircular collector strip is substantially one hundred and eighty degrees, the selection of rotation is the shortest possible travel for the rotation of the disc to position the selected function at an operating position.

Another object is the provision of a brake contact on the rotary selection disc in the circuit of the selected energized brush for determining the rotary directional selection arcuate contact strip and for closing a circuit with a contact at the selected position, to stop the rotating disc after its selected bidirectional movement. The selectively energized brush that determines the directional selection may also function as the brake energizing circuit, to stop the member at the proper position or to initiate another circuit function. The completion of one circuit for direction selection and the starting of the next in an electronic series is novel. The utilization of the energized brush as a directional factor as well as a brake or an additional function factor is novel whether it is used as an imprinting or punching machine or an interconnected circuit of an electronic storing and transmitting or computing apparatus.

The simplest form for demonstrating the logic disc of this invention is in the imprinting or punching apparatus but such application is only one use of this invention. It may be used in transfer information of computer and also long program control circuits wherein information is stored on magnetic drums which have to be scanned annularly and longitudinally to relay this information for the balance of the circuit. Thus the present circuit provides a fast rotary logic circuit for circular scanning of the drum simultaneously with a longitudinal scanning circuit to pinpoint the information and relay it to the proper operating channels to complete the function.

Another object of this invention is the adaptation of this logic circuit to a lineal scanner. If the circuit point or indicia or information sought for is dispensed lineally whether in a straight line or a line following a specific curve that has no repeated positions such as two quarters of a sine wave, this logic circuit may also be employed to determine whether the logic of the selector is in the direction back or forward left or right. This logic circuit may be laid out lineally or annularly. It is very accurate particularly when the operation is by punched tape or cards. It is very fast in its logic, selection and positioning. It has no comparison to manual operation or mere mechanical stop abutments that are inserted and withdrawn. Its accuracy is of computer standard of which it may be employed as a part for lineal and rotary scanning of a drum having standard base sequence selections contacts or a memory drum or cylinder of considerable width. The selection for this logic circuit may be displayed on a disc and the rotary as well as the radial extent would be by a dual logic circuit of this invention. Thus the use of the logic circuit of this invention may supplement different factors and stages in computer machines as well as other types of selectors employing such functions capable of being selected and completed by this invention. One factor is the use of the same brush in the logic circuit to complete one or more other circuits in the same sequence such as stopping the movement of the printed circuit and the rotary member at the selected position by applying a braking circuit but also functioning to perform the function whether printing, stamping, embossing, blanking out or otherwise closing another selected circuit to continue the initiated program. The same brush starts the logic circuit, sets up the brake circuit and may complete the operating circuit. Thus the single brush completes three separate and individual functions in an embossing or printing machine which is also applicable to a computing machine wherein the same brush transmits the selected information within a very short interval of time. When combined movements require two logic circuits the functions performed are thus multiplied by three as each function of each logic circuit may in combination produce or initiate a third function.

Other objects and advantages of this invention appear hereinafter in the following description and claims.

The accompanying drawings show for the purpose of exemplification without limiting this invention or the claims thereto, certain practical embodiments illustrating the principles of this invention; wherein

The rotary member carrying the logic determining control may be a flat disc cylindrical or spiral and a part of such member or drum that carries the information being called upon for a service, a control or further circuitry program. It may be combined such as an annular determination for one phase and a helical for the longitudinal and thus provide the combination of dual logic operations to complete a function.

The logic machine employed to disclose this invention is mounted on the cabinet 1 which contains independent drawers that when inserted complete the circuits of the relays and the transistors that they contain into a circuit in connection for carrying out the function determined by the logic controlled by this machine. The cabinet may house as many as three or more drawers of circuitry which represents the complete logic machine for manual operation needing only a power source as the circuitry itself provides its own direct current power supply within the cabinet.

The auxiliary housing 2 contains a computer encoder and translator which may be operated by a receiver code, a perforated or magnetic tape or a punched card as shown at 3 containing perforations that when stepped through the encoder functions to energize the readout mechanism that is directly connected to the circuitry in the cabinet for automatically operating the embossing machine. The switch to the right indicated at 4 will turn the machine on providing power is supplied. The power to the motors is supplied through switch 5. If placed in the automatic position the perforated card when stepped through the machine will read out all of the functions that are to be properly located and positioned on the readout member 6.

The keyboard indicated at 10 may have the usual indicia commonly found in a typewriter or circuit initiator and at substantially the same position and including a back space, a line return, two space buttons and a carriage return with a line advance at the bottom of the keyboard in the arrangement as stated. The carriage return and line return may be combined in a single button to return the readout 6 to the position for receiving a new series of circuit information. Each of the keys close a circuit most of which are indicated in the circuit diagrams hereafter described.

The keyboard 10 is supported by the plate 11 on top of the cabinet 1 as is the readout member 6.

Figure 1:
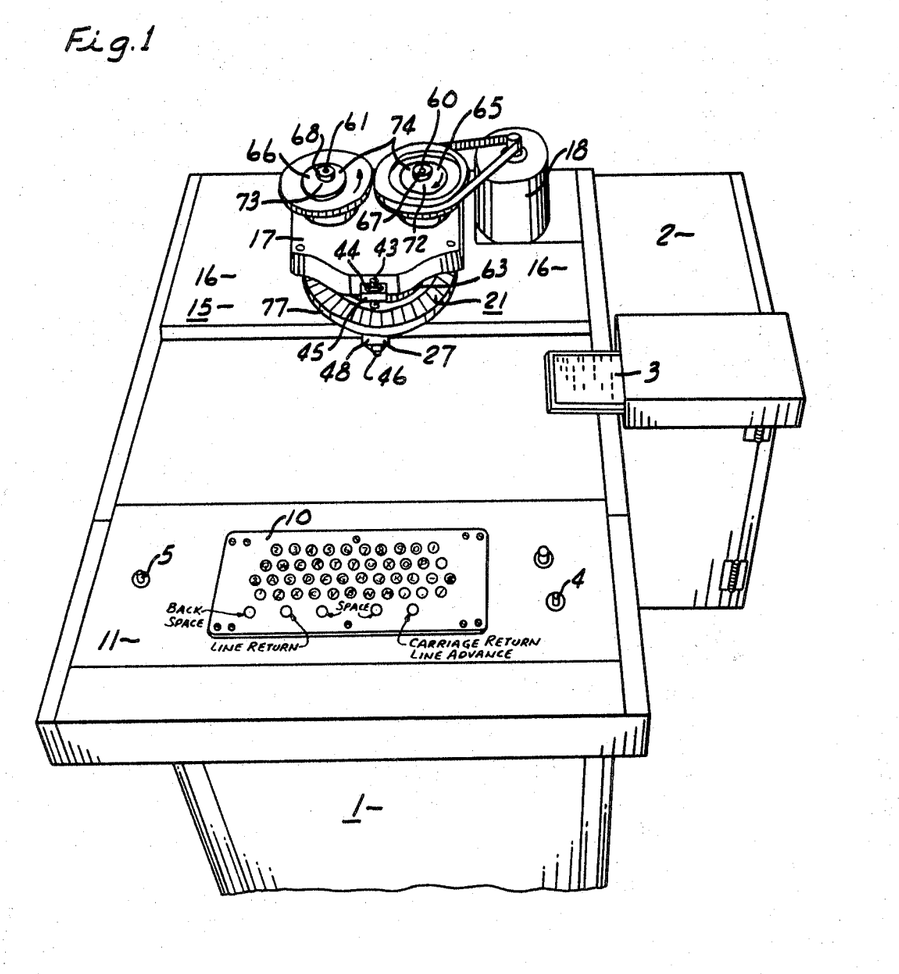
FIG. 1 is a perspective view of the top of a machine having the logic circuit structure comprising this invention.
Figures 2, 7:
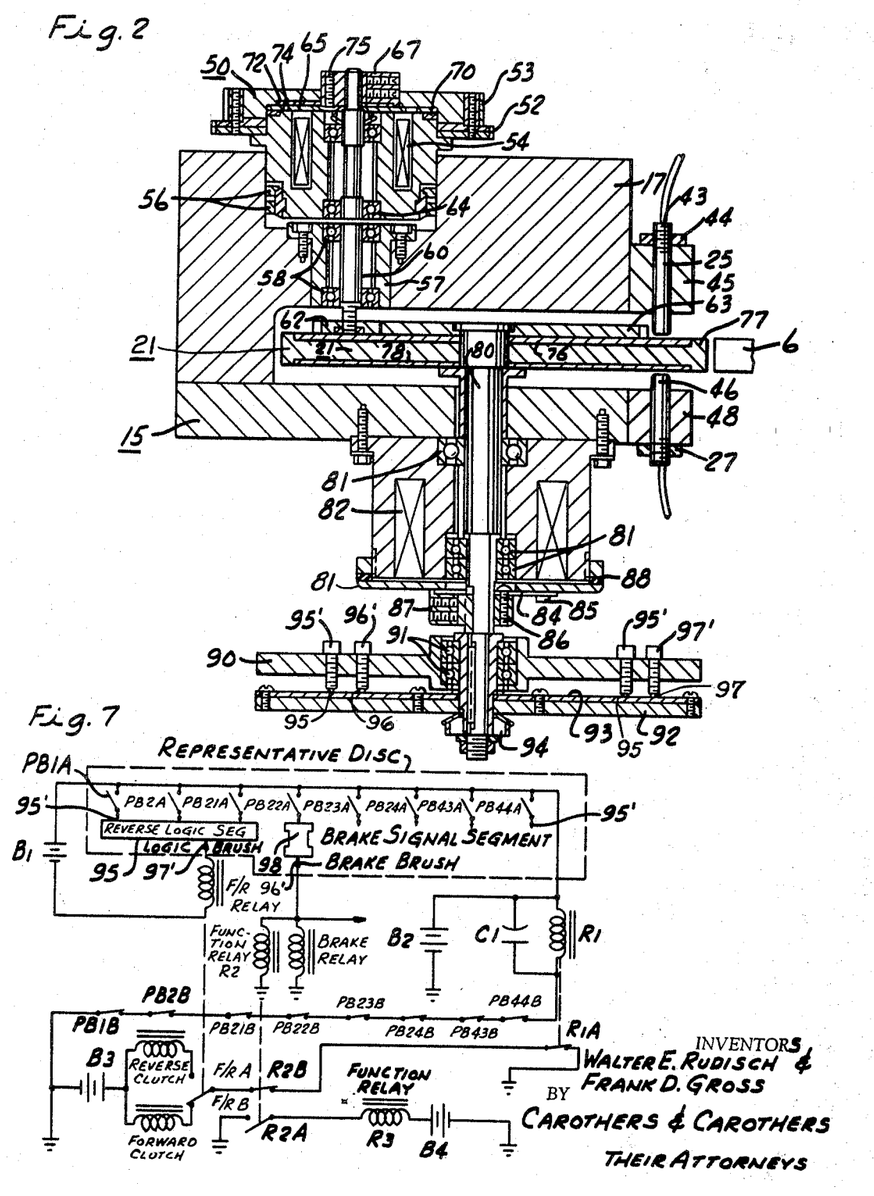
FIG. 2 is a sectional view of the machine having the logic circuit structure comprising this invention.
FIG. 7 is a schematic circuit diagram of a complete abbreviated logic circuit comprising this invention.
Figure 3:
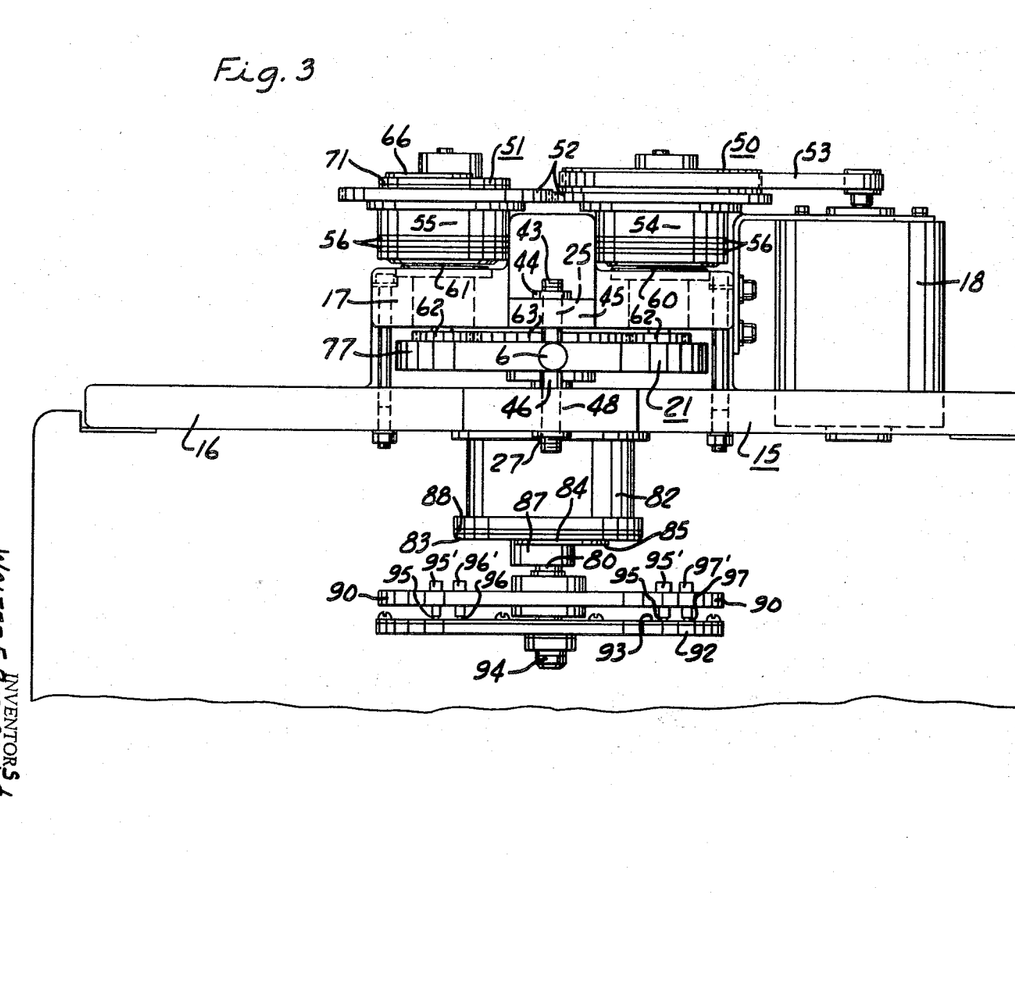
FIG. 3 is a view in front elevation of the machine having the logic circuit structure with the keyboard removed.

The machine is shown in detail in FIGS. 2 and 3 and in conjunction with FIG. 1 demonstrate that the base 15 has the lateral extensions 16 that are secured to the cabinet by the bolts as indicated but this section of the machine represents that part having the mechanically movable sections that comprise one part of this invention. The base 15 also is provided with an integral C-shaped portion 17 which overhangs the central part of the base 15 and provides for support of the circuit drum or wheel and the parts associated therewith. The top portion 17 contains the bearing members carrying the several shafts making up the rotary drive of the logic machine.

The lateral or side portions 16 are made integral with the top center portion 17 and support the unidirectional rotary motor 18. The motor 18 provides initial power that rotates the circuit drum or wheel indicated at 21. Thus by lifting the sides 16 and the top 17 as a unit the whole of this structure may be raised free of the circuit drum or wheel as the only connection therewith are through the small driving wheels 62.

The readout member 25 that picks up the circuit control from the control drum or wheel 21 is threadably connected to the top center portion 17 by the threaded pin 43 held by the lock nut 44. The readout member 25 extends through the stationary guide 45 which is bolted or otherwise secured to the upper section 17 of the frame as illustrated in FIGS. 1, 2 and 3.

Below the circuit drum or wheel 21 a circuit connector 46 is adjustably mounted by the threaded stem and locked in place by a lock washer and jam nut as indicated at 27. The end of this circuit connector is arranged to permit it to be positioned at the proper height relative to the circuit drum or embossing wheel 21. The threaded stem supporting this circuit connector is received in the threaded small casting 48 that is bolted or otherwise secured to the frame as indicated at FIG. 3.

The rotation of the circuit drum or wheel 21 or other rotary member that is to be controlled, is as previously stated, maintained through the continuously operating unidirectional motor 18 that drives the rotary assembly 50 in a clockwise direction, as shown in FIG. 1, and the rotary assembly 51 in a counterclockwise direction owing to the fact that these two members are connected by the intermeshed similar gears of the same size indicated at 52. The belt that drives the member 50 is preferably a tooth-type belt as indicated at 53. Each of the rotary assemblies 50 and 51 as more clearly illustrated in FIG. 2 have their gears 52 secured to the electromagnetic clutch housings 54 and 55 each of which has an exterior set of collector rings 56 that are insulatingly supported on the exterior of the housings and are arranged to be engaged by a suitably supported set of brushes mounted on the upper section 17 of the frame. These brushes are not shown. A sleeve 57 is mounted in the casting 17 on each side of the shaft 26 for supporting antifrictional bearings 58 that carry the respective shafts 60 and 61 for the respective rotary assemblies 50 and 51. The bottom of each of these shafts carry a pinion gear 62 that meshes with an external gear 63 secured to the circuit drum or embossing wheel 21. When this top assembly is lifted these gears merely become disengaged from the gear 63. This gear 63 is clearly shown in FIG. 1 and is also illustrated in FIGS. 2 and 3. Thus the pinion gears 62 for the shafts 60 and 61 are at all times in mesh with the gear 63 that forms a part of the circuit drum or wheel 21.

Another set of antifrictional bearings 64 support the respective shafts 60 and 61 in their respective housings of the electromagnets 54 and 55 which is secured to the rotary assemblies 50 and 51, respectively. Thus the shafts 60 and 61 may have relative movement not only the frame section 17 but also relative to their respective electromagnetic clutches 54 and 55. Since these electromagnetic clutches are rotating at all times the respective shafts 60 and 61 are only rotated when selected by the respective electromagnetic operating mechanisms 54 and 55. This is controlled through the clutch plates 65 and 66, which as shown in FIGS. 1 to 3, inclusive, and more particularly in FIG. 2, are secured to the cylindrical bosses 67 and 68 which in turn are secured by Allen screws to their respective shafts 60 and 61.

Each clutch disc 65 and 66 is magnetic material and is provided with a definite air gap between the electromagnetic coils and the disc but when the electromagnetic coils are de-energized the clutch discs 65 and 66 are free without frictional engagement with the friction bands 70 and 71 shown respectively in FIGS. 2 and 3. The spider type leaf springs 72 and 73 have their triangular apices secured to their respective clutch discs by the screw members 74 whereas the inner portion is secured to the underside of the cylindrical bosses 67 and 68 by the screw members 75 as shown in FIG. 2. Thus the clutch discs or plates 65 and 66 are movable vertically through the flexing of the springs 72 and 73 which attach these discs to the respective cylindrical bosses 67 and 68. When the electromagnets 54 and 55 are deenergized these discs ride free of engagement from the friction material 70 and 71 but when the respective electromagnet is energized then the clutch disc engages the friction material to lock the same therewith and cause the respective shaft 60 or 61 to rotate. Thus depending upon which electromagnet 54 or 55 is energized determines the direction of rotation of the circuit drum or wheel by the energization of their respective electromagnets 54 and 55. The circuit energizing these electromagnets is, of course, made so that it is impossible to energize them simultaneously. Here it should be shown that no countershaft is employed which simplifies this circuit drum structure over that of the previous disclosure and represents an important novel improvement of this invention.

The circuit drum or wheel 21 as illustrated in FIG. 2 is made up of four different parts: first, the gear 63; next, the member 76 which is the top section of the circuit drum and which is attached to the gear 63 to cooperate with the readout 25; third, the intermediate section 77 of the circuit drum or wheel that cooperates with the readout member 6; and lastly, the lower section of the circuit drum or wheel 78 which cooperates with the readout 46. The circuit drum or wheel 21 is held on the shaft by the same lock nut assembly used on the bottom of the shaft 80.

Each of the members 63, 76, 77 and 78 are secured together and are keyed with the hub to the shaft 80 carried by the antifrictional bearings 81 mounted in the bore of the housing for the brake 82 secured to the underside of the base casting 15 as illustrated in FIG. 2.

As previously stated the rotary shafts 60 and 61 are selectively rotated by the logic circuit of this invention to proceed the shortest distance within the 180° for the next consecutive indicia or circuit to be submitted. When it arrives at the proper position the respective clutch disc 65 or 66 is released and the electromagnetic brake 82 may be energized to stop the circuit drum or wheel 21 at the proper position and permit the function to take place. This brake disc 83 is carried by a similar triangular leaf spring 84 secured by the bolts 85 to the disc 83 and by the bolts 86 to the cylindrical boss 87 that in turn is secured to the shaft 80. Thus the brake disc 83 which is of magnetic material is held free of the friction material 88 when rotating but when the electromagnetic brake 82 is applied the coil draws the disc against the brake material 88 and quickly arrests the motion of the circuit drum or wheel. This electromagnetic wheel brake 82 will be discussed with relation to the logic circuit.

Below the electromagnetic brake 82 for the circuit drum or embossing wheel 21 a stationary brushholder 90 is supported from the underside of the base 15 by an extension arm or arms and its central portion may be provided with the antifrictional guide bearings 91 to steady the brushholder relative to the rotary disc 92 secured to the shaft 80 and carries on its face an insulating disc with the printed circuit indicated at 93. This logic disc is secured by means of the key and locking structure indicated at 94 in FIG. 2 relative to the shaft 80 so that it rotates therewith at all times. Thus the logic disc carrying the printed logic circuit is fixed on the shaft 80 relative to the indicia of the dies making up the circuit drum or embossing wheel 21 and the brushes indicated in the circular arrangement or path represent respectively the stationary counterpart of each of the indicia or circuit functions found in the circuit drum or embossing wheel 21 and on the printed circuit is the arcuate contact segment 95. Whereas the single brush 96' engaging the inner collecting ring circle 96 represents the brush that operates the electromagnetic brake 82 which is connected to the contact 98 which is in the same circular path as the arcuate contact 95. The outer circular ring 97 of the printed circuit represents the collecting ring for the independent brushes 95' that engage in the circular path of the segment 95 and of each independent brush and the brushes are employed not only in the logic circuit for each of the characters but also function in the brake circuit for that particular circuit or integer and also functions as the third circuit for the operation of the selected circuit function to be energized or performed. These brushes are illustrated in a diagrammatic showing of the brushholder illustrated in FIG. 5. The printed circuit of the disc rotation logic and brake circuit is illustrated in a plan view in FIGS. 4 and 6 wherein the inner circular collector ring 96 represents the collector ring for the brake and function initiating brush circuit through contact segment 98. This collector ring is provided with a single electrical conducting segment at 98 in the intermediate circular path of the segment 95 for the logic circuit. It will be noted in FIG. 4 that the intermediate circular path 95 is less than or substantially 180° and there is gap or space between the brake and function circuit brush contact segment 98 and this semi-circular contact segment 95 for the logic circuit, is only approximately 3.405°. Whereas the radial extent of the brake sector 98 in the path of the segment 95 of the logic circuit, extends approximately 5.45° and the semicircular contact segment 95 extends through approximately 167.06° which is sufficient to perform the logic circuit of this invention. As used in this specification the contact segment 95 of the printed circuit representing the intermediate path functions only in the logic circuit through its collector ring 97. The single brake and function contact portion interjected in this same circular path and indicated at 98 is employed by the logic circuit function brushes 95' and has its own collector ring 96.

Figures 4, 5, 6:
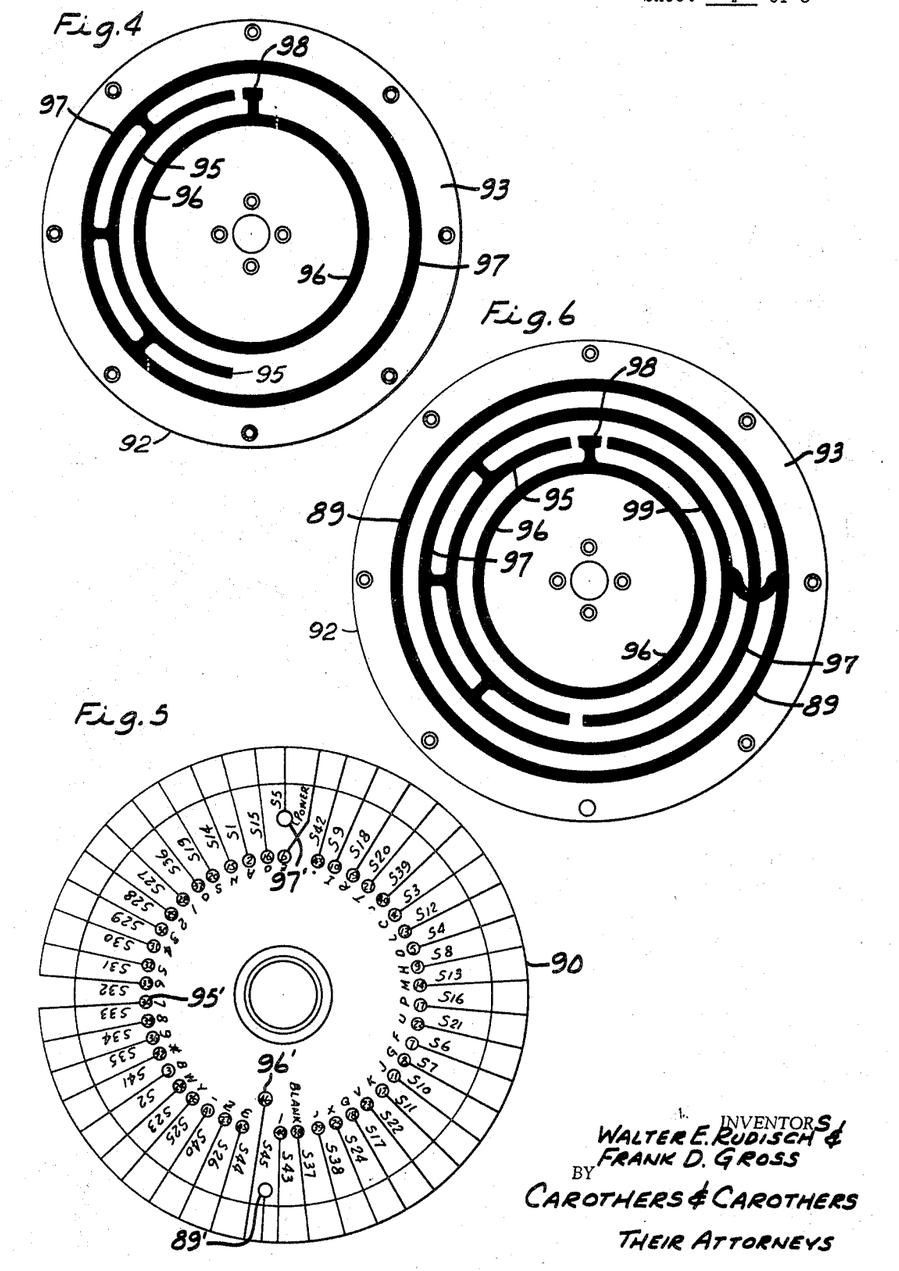
FIG. 4 is an enlarged plan view of a printed circuit disc for the rotation logic and operating circuits.
FIG. 5 is an enlarged plan view of the brush holder with indicia or operating circuit brushes, a brake brush and a segment collector ring brush.
FIG. 6 is an enlarged plan view of a modified printed circuit disc for the rotation logic and operating circuits.

As shown in FIG. 6 the substantially semicircular arcuate contact indicated at 99 represents the counterpart of the semicircular contact segment 95 in that same path and may represent a portion of the printed circuit which may not be connected to anything and would be merely applied to the disc so that substantially the whole of the intermediate circular portion would provide a similar riding surface for all of these brushes as the disc 92 is rotated. This would be strictly for the purpose of providing a substantially uniform engaging surface for the brushes in that circle. However, FIG. 6 shows a collector ring 89 connected to the semicircular contact 99 to employ the same in a circuit in combination with the contact 98 by the same annular series of logic brushes 95' which is a novel circuit.

As shown in FIG. 5 the stationary brushholder 90 carries a brush for each indicia or circuit as indicated by the indicia inserted therein and the logic collecting ring brush 97' is indicated to be in line with the exterior annular path of the collector ring 97. Whereas the brake and function brush collector is indicated at 96' and engages the brake collector ring 96 as indicated in FIG. 4. The particular arrangement of these brushes representing their respective selective circuits or indicia is of patentable importance in the selection of the direction of rotation of a logic circuit. A shorter distance and an ultimate quicker dispatch in carrying out the function represented by this circuit or indicia is enhanced by this specific arrangement of the indicia.

In FIG. 6 the disc 92 is the same but has two additional contacts, the arcuate contact 99 and its collector ring 89. The brush for this collector ring is shown at 89' in FIG. 5.

FIG. 7 is an abbreviated logic circuit which employs a substantially semicircular contact segment 95 for the logic circuit and a relatively small contact segment 98 as the brake segment which may be mounted on a rotary disc 92 as shown in FIG. 4 or movable insulating member employed lineally as shown in FIG. 7 wherein the contact segments may be reciprocated to complete the circuit. The contact segment 95 is connected through brush 97' directly to the F/R relay which is the forward-reverse relay, the opposite end of its operating coil being connected to a source of power such as the battery B1 the positive end of which is connected to the front contacts of the relay type pushbuttons PB1a to PB44a. These push buttons are magnetically held as a relay or they may be made to actuate auxiliary relays as in the other circuit. Each pushbutton PB has its back contact respectively as PB1b to PB44b all of which are connected in series one end of which is connected to ground adjacent the PB1b back contact and the opposite end being connected to the R1 relay which is a normally energized relay and when deenergized delays in dropping out to open its front contact R1a. The operating coil of the relay R1 is provided with a condenser in multiple therewith to produce a delay in dropping out when the relay is deenergized. The opposite end of the operating coil R1 relay is connected to the positive side of the battery B2 and the opposite end of the battery B2 is connected to ground. Thus the energizing circuit of the R1 relay is through each of the normally closed back contacts PB1b to PB44b connected in series as illustrated.

The battery B2 also supplies energy to the front contacts a of the pushbuttons PB1a to PB44a for supplying energy through the selected PBa contact which circuit is completed through the contact segment 98 indicated as the brake and signal segment which is directly connected to the brake and thence to ground to complete the circuit and is also connected to the function relay R2. When the selected contact PBa engages the brake and signal segment 98 which energizes the brake to stop the movement of the logic disc and position the selected circuit on the drum 21 at the readout station and it also energizes the function relay R2. Thus the pushbutton members in this circuit function not only to determine the direction of the logic but also energize the brake and function relays to select the proper circuit on the drum. If the selected pushbutton contact or brush 95' engages the reverse logic segment 95 through the selected brush, the F/R relay will be energized to close the front contact F/Ra and connect the reverse clutch from the battery B3 through the F/Ra contact through the back contact R2b and the front contact R1a to ground to complete the circuit for the purpose of energizing the reverse clutch and rotate the disc and the circuit drum in the reverse direction. To move the disc 92 so that the brush 95' of the selected pushbutton moves toward the brake and signal segment 98. If the selected pushbutton contact is connected to a brush that is not engaging the insulated space or the reverse logic segment 99 the F/R relay remains deenergized and its back contact F/Rb energizes the forward clutch from the battery B3 through the F/Rb contact and the back contact R2b and the front contact R1a to ground. As previously stated the front contact R1a of the R1 relay acts as a time delay in dropping out to actuate the clutch either forward or reverse and thus when the pushbutton PB contact is closed a sufficient length of time to energize the proper clutch member and move the disc by rotary or longitudinal movement to position the brake segment 98 in engagement with the brush 95' that is selected. At this time the R1a front contact opens to interrupt the clutch circuit and the R2a contact then closes to complete the function to energize the function relay through the battery B4. The same impulse that energizes the brake and function relay R2 provides a signal to release the pushbuttons. This, of course, again reenergizes the relay R1 and its normally closed front contact R1a again closes.

In view of the fact that the F/R relay is energized only when the brush engages the reverse logic segment 95 and the brake and the function R2 relay are energized when the brush engages only the brake and signal segment 98, a plurality of separate circuits can be made through the front contacts of the pushbuttons PB1a to PB44a and these segments.

Since the F/R relay is an ordinary relay its front contact functions to energize the reverse clutch and if this segment 95 is not engaged, then this relay merely remains deenergized so that the forward clutch is energized to operate the logic disc and bring the selected pushbutton brush 95' into contact with the brake and signal segment 98.

This logic circuit is materially reduced in elements and is materially simplified yet it provides a very accurate and positive logic circuit for controlling any selection of the direction of movement for the rotary or lineal logic circuit for selecting only the shortest distance to the brake and signal segment 98 which is an ultimate position of selection of the logic circuit on the drum 21 for the closed pushbutton contact. If the same push button is repeated there is no movement of the logic disc.

Figure 8:
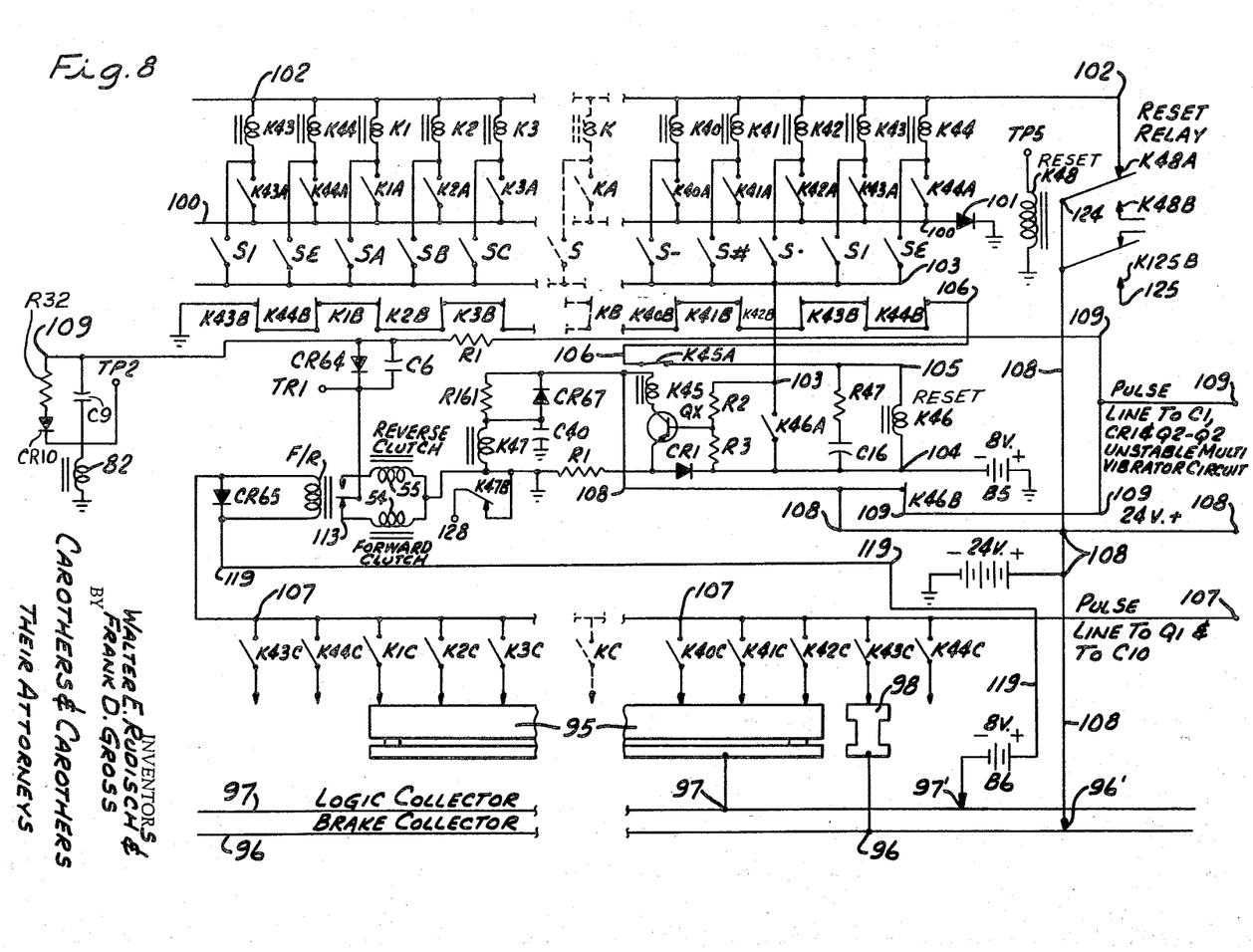
FIG. 8 is a diagrammatic circuit of a second operating circuit for the machine having the logic circuit structure comprising this invention.

A more complex circuit of this character is illustrated in FIG. 8 wherein each of the pushbuttons S shown are indicated with a subsymbol of the character which they represent as found on the keyboard in FIG. 1 and the brushes of FIG. 6. The pushbuttons S between K relays K3 and K40 are repetitious and, therefore, have been indicated collectively by dotted representation. The pushbutton circuits as closed by these keys are not shown in consecutive order but in the order in which the symbols are arranged in their connection to the brushes engaging the semicircular contact of the logic circuit. Each pushbutton is connected to energize one of the series of K relays indicated as K1 to K44, inclusive. When one of the pushbuttons S is closed, it energizes its corresponding K relay and this relay in turn closes its corresponding front stick or holding contact A to connect line 100 through the diode 101 to ground. The line 102 is provided with 24 volts through another relay contact and is connected to one side of the operating coil of each of the K relays. Each of the pushbutton S contacts are connected to the line 103 which may be supplied with a —8 volt through K46A from the battery B5 the other side of which is ground. Thus when any one of the pushbutton S contacts is closed the corresponding K relay is initially charged with 32 volts. However, when the stick or holding contact KA of the K relay closes, it holds the respective K relay energized on only 24 volts. As soon as a selected K relay is energized its back contact B opens. The back contact B of each of the K relays upon opening deenergizes the K46 relay from its negative 8 volts in the line 104 through the operating coil of the K46 relay and thence through the line 105 and the normally closed front contact K45A and thence through the line 106 and through each of the back contacts of the K relays to ground.

Each K relay has a second front contact designated as KC and it is this contact that functions to complete the circuit through the F/R relay or forward-reverse relay in FIG. 8 from a positive circuit of B6 of 8 volts through the operating coil of the F/R relay to the line 107 and thence to the selected front contact KC of the K relays. The selected KC contact is either in engagement with the substantially semicircular contact segment 95 or it is out of engagement therewith and as in the previous circuit of FIG. 7 if it is in engagement with the contact segment 95, the circuit will be completed through the annular collector ring 97 and its corresponding brush 97' to negative side of B6 thereby completing the circuit to the F/R relay and since this F/R relay is energized the reverse clutch will be energized to reverse the direction of rotation of the disc carrying the contact segments 95 and 98. It will, of course, be assumed that the movement of the disc is such that the contact segment 98 will move to the left in FIG. 8 until it engages the selected closed circuit produced by the KC front contact of the selected K relay and thence to complete a circuit from the line 107 to the brush 96' and segment 98 for the purpose of operating the brake.

The K46 relay is a reset relay and it is provided with a time delay in opening as indicated by the resistance 47 and the capacitor C16. The contact K45A which is a front contact normally closed will deenergize the K46 relay when K45 becomes deenergized.

When K46 is energized it pulses the transistor Qx which puts ground through CR1 diode and the front contact K46a normally open to the common of the relay bank and line 103.

Thus the K46 relay is the start relay and is usually selected as a 6 volt relay operating from a —8 volt circuit.

When K46 is energized it closes its contact K46b and positive 24 volts in line 108 to the pulse line 109 thence through condenser C1 and diode CR1 to the base of the transistor Q2. This positive pulse operates through an electronic circuit as shown in the parent case to supply power to TP1. This is an over energization to the F/R relay shown on FIG. 8 which after functioning is reduced to normal voltage.

Q2 and Q3 are connected to an unstable mutivibrator. The first pulse of Q2 also pulses Q3 through the time delay CR3 and R10 in parallel from line 110. Q3 turns off Q2 through the delay C2 and R9 in parallel and at the same time will pulse Q5 from the line 111.

Q5 in turn pulses Q6 through line 112 and the pulse driver CR5 and R17 in parallel and Q6 in turn turns on Q7 by draining the voltage through the emitter of Q6 for the time that the current travels through the resistance R18.

Q7 supplies an over energization to the clutch forward or reverse depending upon the position of this F/R relay. Q6 puts a short across R18 and R20 which drops the voltage holding Q7 off and Q7 is then pulsed to supply 24 volts at test point TP1 and on the inverse diode CR64. This supplies a full 24 volts from 109 through R1 through CR64 to the forward contact that is shown connected in FIG. 8. If the forward or reverse relay F/R were energized the 24 volt line would be supplied to the reverse contact. As shown the forward contact of the F/R relay is connected to line 113, thence to the operating coil of the forward clutch assembly 54 and thence to ground.

When Q3 is turned on by the pulse generator resistance R10 and condensers C3 in parallel it will in turn shut off Q2 through line 111 and the nonstable circuit of the pulse generator C2 and resistance R9 in parallel will again pulse Q2 and Q2 again turns off Q3. This vibrator circuit stops as it is monostable traveling through one cycle only. When Q2 is turned on the second time it again pulses Q8. This second pulse to Q8 provides a steady current below 24 volts to maintain the clutch closed. In this way the initial high voltage is used to turn on either the reverse or forward clutch and the second pulse to Q2 provides a steady current state to maintain the clutch closed until the printed circuit disc moves longitudinally or rotates until the energized circuit brush 95' of the KC contacts of the K relay reaches the brake or function sector 98 to actuate the brake circuit and the function respectively. The character circuit brush 95' selected through the KC contact thus closes the circuit through the brake or function sector 98 and a pulse of 24 volts from the brake segment through the character or function brush applies a positive pulse on the line 107 which passes through the resistance R4 to turn on the transistor Q1 which pulse puts an apparent negative potential on the diode CR1 through the line 109 which has the effect of turning off Q2 and deenergizes the selected clutch actuating coil 54 or 55. As stated the complete circuit is shown in the parent case.

In view of the fact that this multivibrator circuit of Q2–Q3 has a memory it is necessary to open the circuit by opening K48 to eradicate the memory of this multivibratory circuit which also opens the holding circuit of the selected K1 to K44 relay.

By applying 24 volts to Q1 which turns off Q2, both Q1 and Q2 remain off.

Q5 when turned on by the pulse from Q3 turns on Q10 which is pulsed through condenser C7 from line 110 and Q10 in turn turns on Q11 through the driver resistance R27 in parallel with the diode CR8. Q3 also turns on Q13 after a time delay. Q11 turns on Q12 to supply an overenergization voltage at the diode CR10 at test point TP2, which overenergizing voltage is applied to the operating coil of the brake 82 causing it to quickly actuate. Q11 turns on Q12 to supply an overenergization voltage at the diode CR10 which overvoltage is applied to the brake 82. Thus the brake 82 gets a high pulse overvoltage at the same time it receive a running voltage. This high voltage lasts until the current drains out of the resistance R28 connected with the collector of Q11 but Q13 is maintained on for operating voltage until an impulse is sent through by the opening of the relay K48. K48 resets the logic circuit and K47 resets the K relay circuit. By a similar circuit the energized selected brush 95′ gives the brake 82 a high pulse voltage at the same time that it receives a running voltage. This high voltage lasts until the current drains out of a resistance but is maintained on until a reset impulse is sent through by the opening of the relay K48 which is connected to test point 5 or TP5. K48 resets the logic circuit whereas K47 resets the relay.

The same pulse that turns on Q1 to deenergize the forward or reverse clutch 54 and 55 also sends the pulse to line 107.

At the end of the selected function the electronic circuit supplies 24 volts to TP5; the operating coil of the reset relay K48 which is shown in its deenergized position for the purpose of connecting line 102 to heel 124 and to the 24 volt line 108 that is connected to a positive supply of 24 volts of direct current. Thus while the K48 relay is deenergized the line 102 will supply 24 volts to the K series relays from K1 to K44 through the line 102 as shown in FIG. 8. The reset relay K48 is pulsed to energize the same and remove the voltage from the series of K relays causing the selected relay to drop. The pulse is removed, thus dropping the relay K48 to the position as shown in FIG. 8. If the automatic control of the readout mechanism 6 is to be operated by a card as indicated at 3 in FIG. 1, the reset relay K48 connects the power line 124 to 125 to supply a direct current power thereto.

Line 114 which supplies a pulse from Q52 is connected through the resistance R46 and the diode CR11 to the line 128. The line 109 which is connected to the base of Q2 is also connected through the diode CR2 to the line 128. Line 128 is in turn connected directly to the front contact K47A of relay K47 the heel of which is connected directly to ground. Relay K47 has one side of its operating coil connected to ground and the other side connected to resistance R161 and thence directly to a 24 volt DC source. The resistance R161 has connected in parallel therewith the diode CR67 inversely directed to 108 the 24 volt DC supply. A condenser C40 is also connected between ground and the connection between the operating coil of K47 and the resistance R161. This circuit with these diodes CR2 and CR11 prevents the multivibrator circuit from floating and if for any reason the KR47 relay is energized it opens the same to ground which circuit is again returned when the main switch is employed to supply power to the whole of the circuit.

In view of the fact that the readout drive function actuated by a punched tape or perforated card as indicated at 3 involves an ordinary circuit which must be matched with particular results to be lodged by the readout drive function circuit and which will change almost on every installation, the specific design of such a circuit is not believed to be important insofar as this invention is concerned. However, it is important that such a combination may be made to control the logic circuit and operate the machine through a tape or perforated card 3 without the use of the manual pushbutton keyboard 10. Although the readout drive function with the card 3 is illustrated as being on this machine, it, of course, may be in a central location remote of the machine 1 and may be represented by only a portion of the card readout circuit that is employed to control the operation of one or more other functions simultaneously. Even though this logic circuit is illustrated for use on a logic machine such an illustration is merely demonstrative of one use of this invention as it merely illustrates the energization instituted for one specific function in determining the direction of rotation of the logic circuit and upon the completion of such rotation to arrest the same by applying a brake and permit another function to be carried further which in the present illustration would be the act of embossing.

We claim:

1. A logic circuit for determining the direction of rotation of a member to perform a function comprising a base, a motor drive for an insulated rotary member rotatably supported from said base to rotate in either direction, an arcuate contact on said insulated member substantially semicircular in length and having a logic circuit connection and an insulated portion in arcuate aligment with said arcuate contact, an annular series of electrically independent brush means supported from said base to enagage in the rotary path of said arcuate contact, each of said brush means representing a specific selective function circuit including said logic circuit connection with said arcuate contat and in the rotary circumference of said annular series of brushes engaging said insulated rotary member, circuit means to energize a specific brush means to energize said motor drive and complete said logic circuit to rotate said insulated member in one direction when its respective energized brush means is in engagement with said arcuate contact, and a second logic circuit to energize said motor drive in the opposite direction when said energized brush means is not in engagement with said semicircular contact and thereby determine the shortest distance to the selected operating position of said rotary member to perform the selected function and a relay with a front and back contact and energized through said arcuate contact by a selected brush means to close its front contact to drive said insulated rotary member in one direction and through its closed back contact when the selected energized brush means is not in engagement with said arcuate contact.

2. The logic circuit for determining the direction of rotation of a member to perform a function as set forth in claim 1 including a second contact of less arcuate length than said arcuate contact on said insulated member to be engaged by said selected energized brush means at the selected rotary position of said insulated member to complete a circuit to perform the selected function, a brake means mounted on said base to engage and stop said insulated member when energized, said selected and energized brush means closing a circuit to energize said brake means to stop said insulated member at the preselected position by engaging said second contact on said insulated member.

3. The logic circuit for determining the direction of rotation of a member to perform a function as set forth in claim 2 including a relay function means to complete the selected function, and an independent relay function circuit means to actuate said function means and completed through said selected brush means engages said second contact on said insulated member.

4. The logic circuit for determining the direction of rotation of an insulated member to perform a function as set forth in claim 3 including a relay reset circuit means to clear said logic and brake and function circuits upon the initiation of the latter and through said relay reset circuit means and through said selected brush means engages said second contact on said insulated member.

5. The logic circuit for determining the direction of rotation of an insulated member to perform a function as set forth in claim 1 including an interlock contact circuit means that prevents the energization of all other specific selective circuits when one specific circuit is energized, said interlocking contact circuit means clearing selectively upon the completion of the initiation of the selected function and upon the completion of the selected function.

6. The logic circuit for determining the direction of movement of an insulated member to perform a function comprising a base, a motor driven insulated member supported for reciprocation from said base, a first and a second logic circuit contact mounted in spaced alignment on said insulated member, a function circuit contact mounted in spaced alignment between said logic circuit contacts, an aligned series of electrically independent brush means supported from said base to engage said aligned circuit contacts, circuit means to energize a specific brush means and initiate and move said function circuit contact on said insulated member toward said selected energized brush means, until said selected brush means engages and energizes said function circuit contact, a brake means circuit to arrest the movement on said insulated member as said function circuit contact and an independent function circuit is energized through said selected brush means and said function circuit contact, and a third independent circuit initiated through said selected brush means and said function circuit contact to clear the circuits upon the completion of said independent circuits.

7. A printed logic circuit member for determining the direction of rotation for the selection of a function relative thereto including consisting of, an annularly arranged group of stationary brushes, a rotary member of insulated material, an arcuate contact of substantially semicircular length mounted on said rotary insulated member concentric with its rotary axis and with said annularly arranged groups of stationary brushes to be engaged by the latter, a collector ring on said rotary insulated member connected to said arcuate contact to complete a circuit therewith through a single stationary brush, a second contact on said rotary insulated member spaced from said arcuate contact of an extent to engage only one brush at a time of said annularly arranged group of stationary brushes, and a second collector ring on said rotary insulated member connected to said second contact to complete a circuit, independent circuits through said collector rings and a selected brush of said annularly arranged group of brushes engaging said insulated portion of said insulated member and each of said contacts in the same circular path on said rotary member.

8. A logic circuit member consisting of a movably supported motor driven insulating member, a series of brushes mounted in alignment to engage said movable insulating member as it is moved, each brush when energized selectively representing a specific logic circuit and function circuit, a function circuit contact on said insulat­member substantially the same size as one brush and connected to complete a selected function circuit when engaged by the corresponding selected and energized brush, a logic contact on said insulating member in spaced alignment with and materially longer than said function contact to be engaged by said brushes, a forward and reverse relay connected to be energized from said logic contact, a front and a back contact on said forward and reverse relay, and circuit means to energize a specific selected brush which when in engagement with said logic contact to close said front contact and move said insulating member in one direction and when not in engagement with said logic contact to close a circuit through said back contact and move said insulating member in the opposite direction until said energized brush engages said function circuit contact to initiate the circuit of the selected function.

9. The logic circuit of claim 8 characterized in that said insulating member is a circular disc mounted for rotation in either direction.

10. The logic circuit of claim 8 characterized in that said insulating member is a flat strip mounted for reciprocation in either direction.

11. The logic circuit of claim 8 which also includes a brake means mounted to stop said insulating member, and a brake circuit means connected through said selected energized brush engaging said function contact to energize said brake and stop said insulating member.

12. The logic circuit of claim 8 which also includes a relay reset circuit means to clear said logic and brake and said function circuit upon the initiation of the latter through said reset circuit means.

13. The logic circuit of claim 8 which also includes an interlock contact circuit means to prevent the energization of any other specific selective function circuit when one function circuit is energized, said interlocking circuit means clearing upon the completion of the selected function.

14. The logic circuit member of claim 8 which also includes a second logic contact on the insulating member of the same length and in line with the first logic contact but on the other side of said function circuit contact so that substantially all of said brushes are in engagement with said first and second logic contacts and the movement of said insulating member is accordingly in one direction or the opposite direction by said circuit means to position the energized brush on said function.

15. The logic circuit of claim 14 characterized in that said insulating member is a circular disc mounted for rotation in either direction.

16. The logic circuit of claim 14 characterized in that said insulating member is a flat strip mounted for reciprocation in either direction.

17. The logic circuit of claim 14 which also includes a stationary electric brake means mounted to engage said drive and stop the movement of said insulating member, and a brake relay circuit means connected through said selected energized brush engaging said function contact to energize said brake and stop said insulating member.

18. The logic circuit of claim 14 which also includes a relay reset circuit means to clear said logic and brake and said function circuit upon the initiation of the latter through said reset circuit means.

19. The logic circuit of claim 14 which also includes an interlock contact circuit means to prevent the energization of any other specific selective function circuit when one function circuit is energized, said interlocking circuit means clearing upon the completion of the selected function.

References Cited
UNITED STATES PATENTS

| | | |
|---|---|---|
| 2,884,581 | 4/1959 | Schunemann et al. 318—265 XR |
| 2,978,693 | 4/1961 | Champion _______ 318—20.315 |
| 3,115,597 | 12/1963 | Salzberg et al. ______ 318—466 |

ORIS L. RADER, *Primary Examiner.*

K. L. CROSSON, *Assistant Examiner.*

U.S. Cl. X.R.

318—33, 466, 467